United States Patent
Lee et al.

(10) Patent No.: US 9,965,701 B2
(45) Date of Patent: May 8, 2018

(54) IMAGE PROCESSING APPARATUS AND METHOD

(71) Applicant: Hanwha Techwin Co., Ltd., Changwon-si (KR)

(72) Inventors: YoungHyun Lee, Changwon-si (KR); SeungIn Noh, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 11 days.

(21) Appl. No.: 15/167,286

(22) Filed: May 27, 2016

(65) Prior Publication Data
US 2017/0185867 A1 Jun. 29, 2017

(30) Foreign Application Priority Data
Dec. 23, 2015 (KR) .................. 10-2015-0185100

(51) Int. Cl.
*G06K 9/00* (2006.01)
*G06K 9/62* (2006.01)
(Continued)

(52) U.S. Cl.
CPC .......... *G06K 9/6224* (2013.01); *G06K 9/0063* (2013.01); *G06K 9/00778* (2013.01); *G06K 9/342* (2013.01); *G06K 9/4642* (2013.01); *G06K 9/627* (2013.01); *G06K 9/6249* (2013.01); *G06K 9/6277* (2013.01); *G06T 11/001* (2013.01)

(58) Field of Classification Search
CPC .. G06K 9/6224; G06K 9/00778; G06K 9/342; G06K 9/6249; G06K 9/627; G06K 9/6277; G06T 11/001
See application file for complete search history.

(56) References Cited

U.S. PATENT DOCUMENTS

| 8,812,344 B1 * | 8/2014 | Saurabh ............. G06Q 30/0201 705/7.29 |
| 2005/0025341 A1 * | 2/2005 | Gonzalez-Banos ............... G06K 9/00778 382/103 |

(Continued)

FOREIGN PATENT DOCUMENTS

| JP | 5597781 B1 | 10/2014 |
| JP | 2015-508544 A | 3/2015 |
| KR | 10-2015-0080863 A | 7/2015 |

*Primary Examiner* — Aaron W Carter
(74) *Attorney, Agent, or Firm* — Sughrue Mion, PLLC

(57) ABSTRACT

There are provided an apparatus and method for generating a heat map that displays crowd density with visual properties such as colors. The image processing apparatus includes at least one processor to implement: an information obtainer configured to obtain an image by photographing a region of interest and location information indicating a location from which the image is photographed; a density map generator configured to generate a crowd density map of the image based on crowd density information estimated from the image; a perspective map generator configured to generate a perspective map that provides distance information indicating a real-life distance between two points of the image based on the location information; and a heat map generator configured to generate a heat map that displays the crowd density information on a map of the region of interest based on the distance information.

18 Claims, 16 Drawing Sheets

(51) Int. Cl.
*G06K 9/34* (2006.01)
*G06T 11/00* (2006.01)
*G06K 9/46* (2006.01)

(56) References Cited

U.S. PATENT DOCUMENTS

| | | | | |
|---|---|---|---|---|
| 2008/0063299 | A1* | 3/2008 | Murai | G01C 11/00 |
| | | | | 382/284 |
| 2010/0322516 | A1* | 12/2010 | Xu | G06K 9/00778 |
| | | | | 382/173 |
| 2012/0032795 | A1* | 2/2012 | Ishii | H04N 1/00137 |
| | | | | 340/539.1 |
| 2012/0254369 | A1* | 10/2012 | Gillard | H04N 13/004 |
| | | | | 709/219 |
| 2013/0181993 | A1* | 7/2013 | Herring | G06T 11/206 |
| | | | | 345/440 |
| 2014/0055610 | A1* | 2/2014 | Ko | G06K 9/00771 |
| | | | | 348/143 |
| 2014/0203909 | A1* | 7/2014 | Elgebaly | G06Q 10/06 |
| | | | | 340/8.1 |
| 2015/0187102 | A1* | 7/2015 | Park | G09G 5/02 |
| | | | | 345/589 |
| 2015/0278608 | A1* | 10/2015 | Matsumoto | G06K 9/00342 |
| | | | | 348/143 |
| 2016/0358027 | A1* | 12/2016 | Hotta | G06K 9/00785 |
| 2017/0185867 | A1* | 6/2017 | Lee | G06K 9/6224 |
| 2017/0200052 | A1* | 7/2017 | Carey | G06K 9/00778 |
| 2017/0351924 | A1* | 12/2017 | Hotta | G06K 9/00778 |

* cited by examiner

IMAGE PROCESSING APPARATUS AND METHOD

CROSS-REFERENCE TO RELATED APPLICATION

This application claims priority from Korean Patent Application No. 10-2015-0185100, filed on Dec. 23, 2015, in the Korean Intellectual Property Office, the disclosure of which is incorporated herein in its entirety by reference.

BACKGROUND

1. Field

Methods and apparatuses consistent with exemplary embodiments relate to an apparatus and method for image processing, and more particularly, to an apparatus and method for generating a crowd heat map.

2. Description of the Related Art

A heat map is a very effective browsing tool used by various image monitoring systems. The heat map shows various types of data, which may be represented as colors, in the form of visual graphics such as a heat distribution on an image. The heat map may represent interest of customers or complexity on a camera image or a map in color steps.

SUMMARY

One or more embodiments include an image processing apparatus and method whereby a crowd heat map visibly representing a crowd density with respect to a wide region is provided.

Additional aspects will be set forth in part in the description which follows and, in part, will be apparent from the description, or may be learned by practice of the presented embodiments.

According to an aspect of an exemplary embodiment, there is provided an image processing apparatus including at least one processor to implement: an information obtainer configured to obtain an image by photographing a region of interest and location information indicating a location from which the image is photographed; a density map generator configured to generate a crowd density map of the image based on crowd density information estimated from the image; a perspective map generator configured to generate a perspective map that provides distance information indicating a real-life distance between two points in the image based on the location information; and a heat map generator configured to generate a heat map that displays the crowd density information on a map of the region of interest based on the distance information.

The density map generator may include: a splitter configured to split the image into patch images representing different areas of a same size; and a classifier configured to estimate a crowd density class of each of the patch images based on characteristic information extracted from each of the patch images.

The splitter is configured to resize the patch images to have a same pixel size, and the classifier is configured to estimate the crowd density class of the patch images using the resized patch images.

The classifier is configured to calculate a probability with respect to each of previously set crowd density classes using the characteristic information of the patch images and classify each of the patch images based on the probability.

The density map generator is configured to allocate different visual properties to the patch images based on the crowd density class.

The perspective map shows multiple horizontal lines, and a real-life distance between two adjacent horizontal lines from among the multiple horizontal lines is uniform.

The heat map generator is configured to adjust transparency of the crowd density map that overlaps the map of the region of interest.

The heat map generator is configured to merge crowd density information of a plurality of crowd density maps at an overlapping region according to a preset merge condition and display the merged crowd density information on the map of the region of interest.

The location information may include GPS information and altitude information.

The location information indicates a location of an aerial vehicle in which a camera that created the image is mounted.

According to another aspect of an exemplary embodiment, there is provided an image processing method performed by an image processing apparatus, the image processing method including: obtaining an image by photographing a region of interest and location information indicating a location from which the image is photographed; generating a crowd density map of the image based on crowd density information estimated from the image; generating a perspective map that provides distance information indicating a real-life distance between two points in the image based on the location information of the camera; and generating a heat map that displays the crowd density information on a map of the region of interest based on the distance information.

The generating of the crowd density map may include: splitting the image into patch images representing different parts of the region of interest, the different parts being of a same real-life size; and estimating a crowd density class of each of the patch images based on characteristic information extracted from each of the patch images.

The estimating may include: resizing the patch images to have a same pixel size; and estimating the crowd density class of the patch images using the resized patch images.

The estimating of the crowd density class may include: calculating a probability with respect to each of previously set crowd density classes using the characteristic information of the patch images and classifying the patch images based on the probability.

The generating of the crowd density map may include: allocating different visual properties to the patch images based on the crowd density class.

The perspective map shows multiple horizontal lines, and a real-life distance between any two adjacent horizontal lines from among the multiple horizontal lines is uniform.

The generating of the heat map may include: adjusting transparency of the crowd density map that overlaps the map of the region of interest.

The generating of the heat map may include: merging crowd density information of a plurality of crowd density maps at an overlapping region according to a preset merge condition and displaying the merged crowd density information on the map of the region of interest.

The location information may include GPS information and altitude information.

According to another aspect of an exemplary embodiment, there is provided a non-transitory computer-readable recording medium having recorded thereon a computer program for executing the image processing method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings. In this regard, the embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Moreover, detailed descriptions related to well-known functions or configurations will be ruled out in order not to unnecessarily obscure subject matters of the embodiments.

It will be understood that although the terms "first" and "second" are used herein to describe various elements, these elements should not be limited by these terms. Terms are only used to distinguish one element from other elements.

In the following descriptions of the embodiments, the technical terms are used only for explaining a specific exemplary embodiment while not limiting the inventive concept. The meaning of 'include' or 'comprise' specifies a property, a fixed number, a step, a process, an element, a component, and a combination thereof but does not exclude other properties, fixed numbers, steps, processes, elements, components, and combinations thereof.

Figure 3:
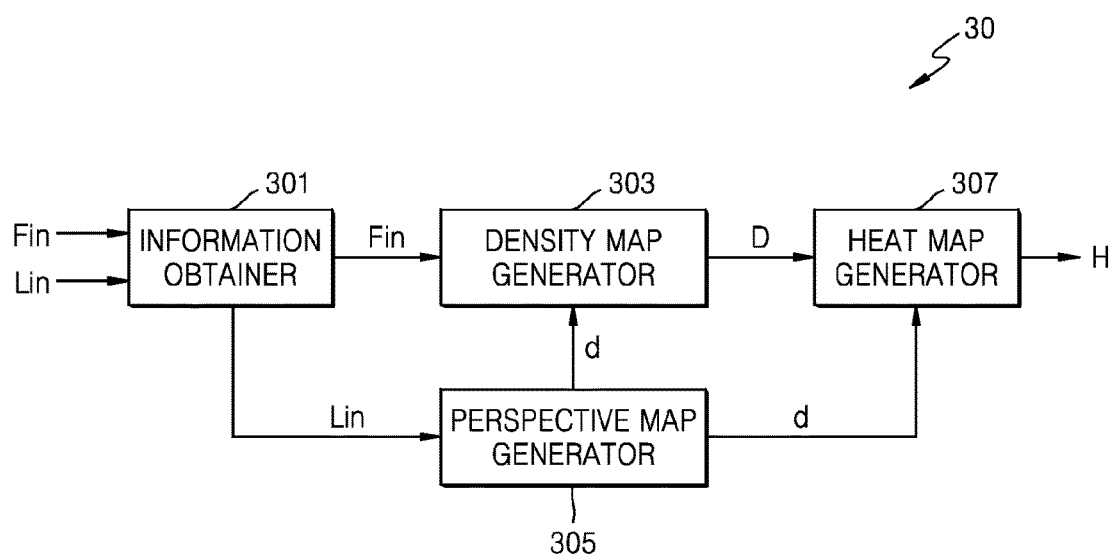
FIG. 3 is a schematic block diagram of an image processing apparatus according to an exemplary embodiment.
Figure 4:
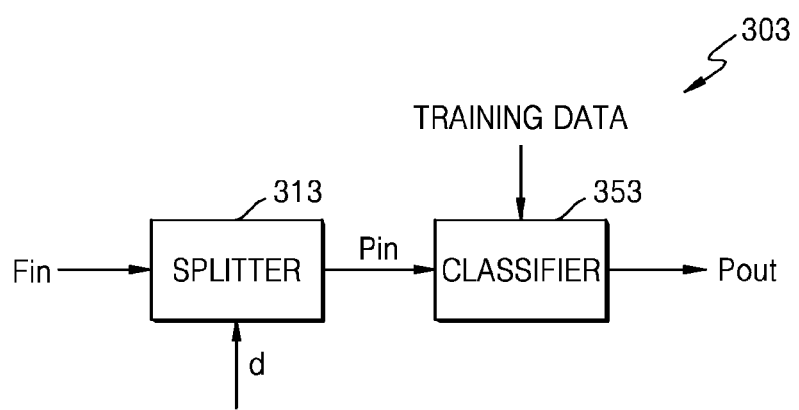
FIG. 4 is a schematic block diagram of a density map generator of FIG. 3.

The inventive concept of the present disclosure may be embodied as functional blocks, e.g., FIGS. 3 and 4, and various processing operations. The functional blocks may be implemented with various hardware and/or software configurations executing specific functions. For example, exemplary embodiments of the present disclosure may employ integrated circuit configurations such as a memory, processing, logic, a look-up table and the like capable of executing various functions upon control of microprocessors or other control devices. In a similar manner to that in which the elements of the exemplary embodiments can be executed with software programming or software elements, the exemplary embodiments may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, the exemplary embodiments may employ conversional arts to establish an electronic environment, process signals and/or process data. Terms such as "mechanism," "element," "means," and "configuration" may be widely used and are not limited to mechanical and physical configurations. Such terms may have the meaning of a series of routines of software in association with a processor or the like.

Figure 1:
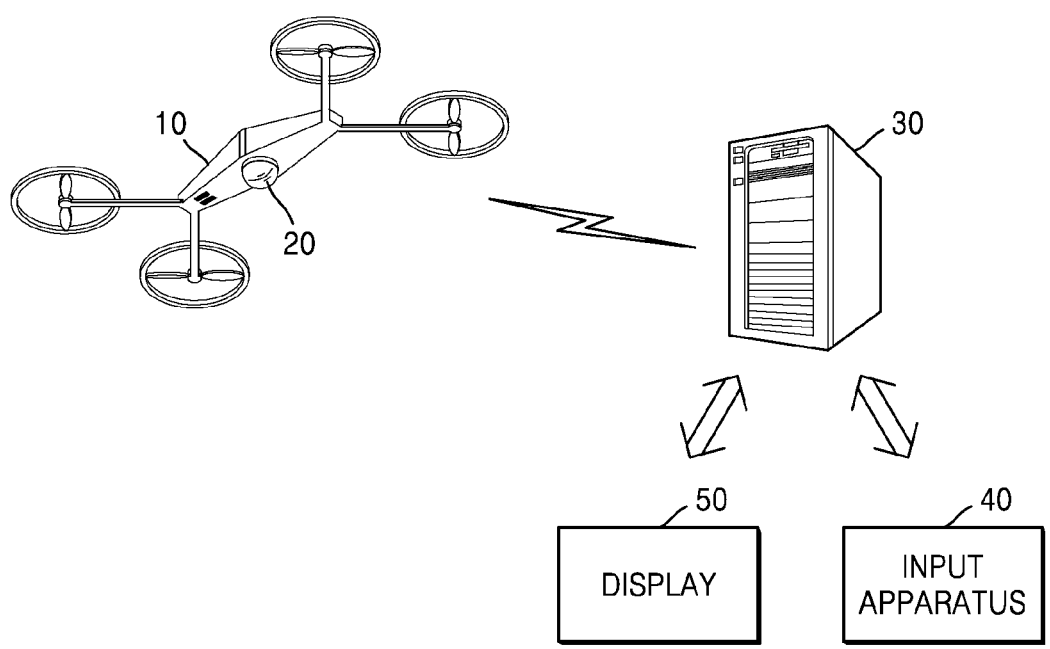
FIG. 1 is a schematic block diagram of a heat map generating apparatus according to an exemplary embodiment.
Figure 2:
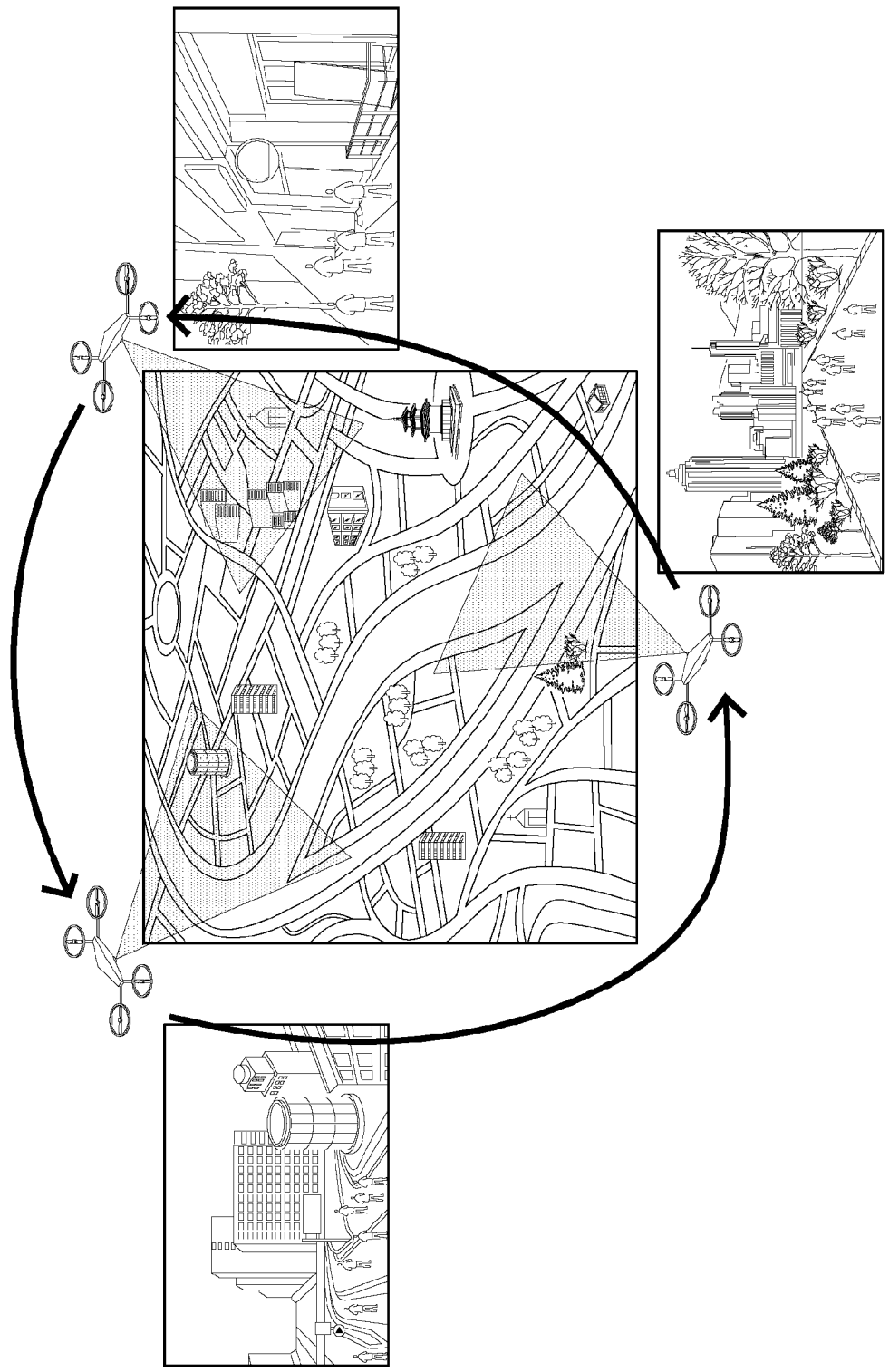
FIG. 2 illustrates an example of an aerial vehicle according to an exemplary embodiment.

FIG. 1 is a schematic block diagram of a heat map generating apparatus according to an exemplary embodiment. FIG. 2 illustrates an example of an aerial vehicle 10 according to an exemplary embodiment.

Referring to FIG. 1, the heat map generating apparatus may include the aerial vehicle 10 and an image processing apparatus 30. The aerial vehicle 1 may include a camera 20.

The aerial vehicle 10 may be a manned aerial vehicle or an unmanned aerial vehicle (UAV). The UAV is an aircraft without a human pilot aboard. The UAV may be controlled via a program previously installed thereon or via a remote control manipulated by an operator. Alternatively, the UAV may autonomously recognize and determine an environment around the UAV. The aerial vehicle 10 may include the camera 20 that obtains image information around the UAV.

The camera 20 may include an imaging device such as a charge coupled device (CCD) or a complementary metal oxide semiconductor (CMOS). The camera 20 may obtain an image with respect to an environment (for example, a static object such as a wall, an obstacle, etc. or a dynamic object such as human, animal, etc.). The camera 20 may obtain the image in real time or on a certain cycle basis.

The aerial vehicle 10 may fly in a region of interest and the camera 20 may photograph the region of interest. To capture a wide region of interest as a single image, the aerial vehicle 10 needs to fly at high altitude. However, since the size of humans becomes too small in an image taken at high altitude, it is difficult to extract crowd density information from the image. As shown in FIG. 2, while the aerial vehicle 10 fly in the region of interest, the camera 20 may obtain an image at a predetermined location or at a predetermined time. The image photographed by the camera 20 may be a top view image or a side view image according to a location of the camera 20 mounted in the aerial vehicle 10.

In an exemplary embodiment, the aerial vehicle 10 may include a wired communication interface and a wireless communication interface including a GPS module. The aerial vehicle 10 may receive images from the camera 20 via wired or wireless communication. The aerial vehicle 10 may receive its location information from a plurality of GPS artificial satellites through the GPS module. The aerial vehicle 10 may be connected to the image processing apparatus 30 over a wireless communication network. The wireless communication network may be various types of networks using various frequency bands. Examples of the wireless communication network may include, but are not limited to, Code Division Multiple Access (CDMA), Wi-Fi, WiBro, Long Term Evolution (LTE), etc. The aerial vehicle 10 may transmit the image and the location information to the image processing apparatus 30 over the wireless communication network.

In another exemplary embodiment, the camera 20 may include a wired communication interface and a wireless communication interface including a GPS module. The camera 20 may receive its location information from a plurality of GPS artificial satellites through the GPS module. The camera 20 may be connected to the image processing apparatus 30 over a wireless communication network. The wireless communication network may be various types of networks using various frequency bands. Examples of the wireless communication network may include, but are not limited to, Code Division Multiple Access (CDMA), Wi-Fi, WiBro, Long Term Evolution (LTE), etc. The camera 20 may transmit the image and the location information to the image processing apparatus 30 over the wireless communication network.

In another exemplary embodiment, the camera 20 may include a wired communication interface and a wireless communication interface including a GPS module. The camera 20 may transmit an image and its location information to the aerial vehicle 10 via wired or wireless communication. The aerial vehicle 10 may transmit the image and the location information to the image processing apparatus 30 via wireless communication.

The image processing apparatus 30 may receive the image and the location information from the aerial vehicle 10 or the camera 20. The location information may indicate the location of the aerial vehicle 10 or the camera 20. The image processing apparatus 30 may extract crowd density information from the received image to generate a crowd density map. The image processing apparatus 30 may use the received location information to extract actual distance information of a scene provided by the image and generate a perspective map. The image processing apparatus 30 may match the crowd density map with a corresponding region of a region of interest map based on the actual distance information of the perspective map to generate a crowd heat map.

The crowd heat map may display a human density in the region of interest via different colors. For example, a high density place with more humans may be displayed closer to the red color, and a low density place with fewer humans may be expressed closer to the blue color, thereby facilitating determination of the human density in the entire region of interest.

The image processing apparatus 30 may interact with an input apparatus 40 and a display 50. The image processing apparatus 30 may be connected to the input apparatus 40 and the display 50 by wired or wireless interface, and communicate with the input apparatus 40 and the display 50.

The input apparatus 40 may be implemented as a key pad, a dome switch, a touch pad (a contact capacitance type touch pad, a pressure resistive layer type touch pad, an infrared ray sensing type touch pad, a surface ultrasound conductive type touch pad), a mouse, a remote controller, a jog wheel, a jog switch, etc.

The display 50 may provide a resultant image output by the image processing apparatus 30 to a user so that the user may monitor the image. The display 50 may provide visual information and/or auditory information to the user.

Figure 5:
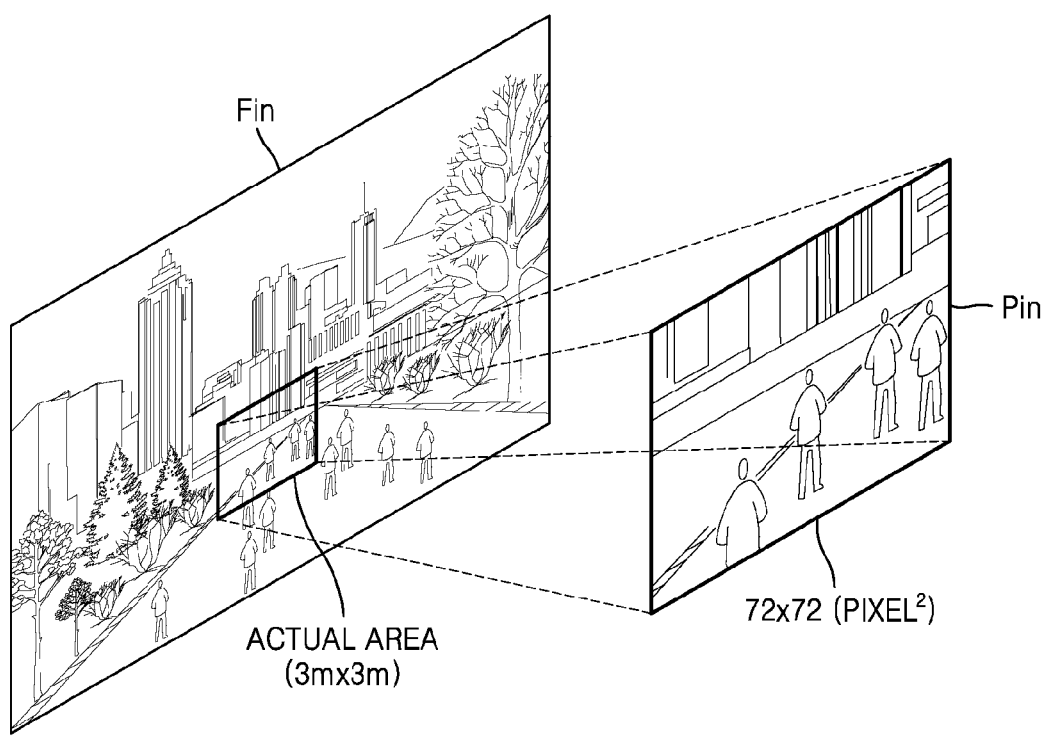
FIGS. 5 through 7 are diagrams for describing an example of generating a density map according to an exemplary embodiment.
Figure 6:
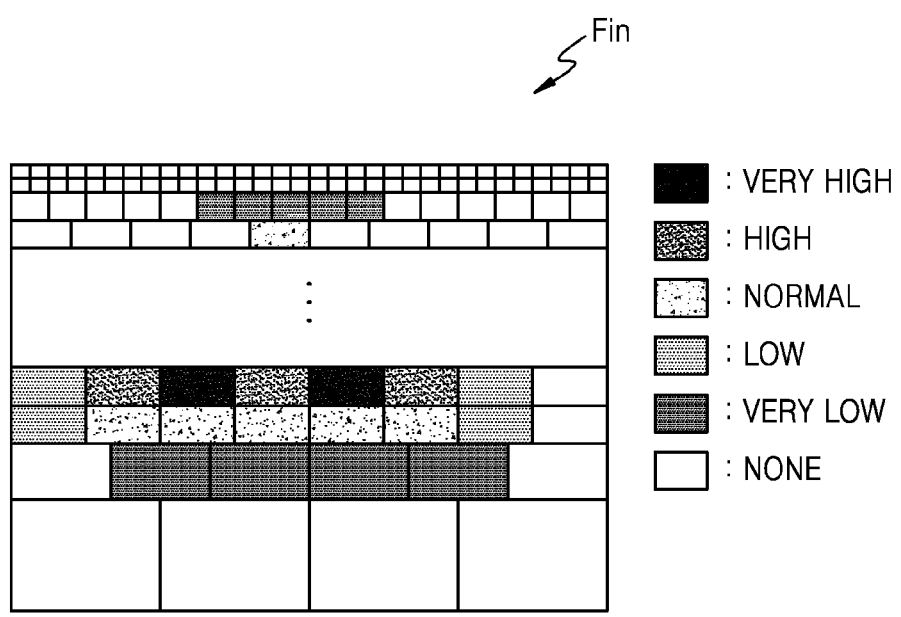
Figure 7:
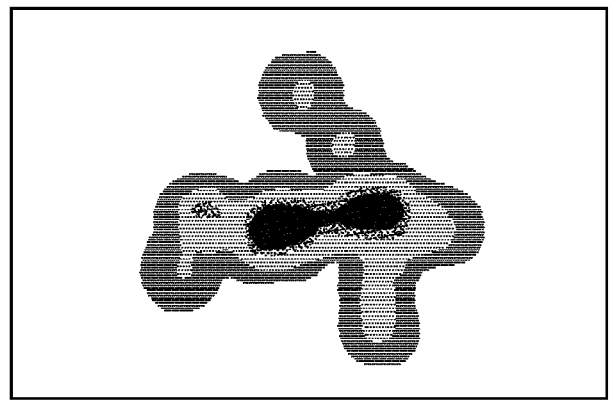
Figure 8:
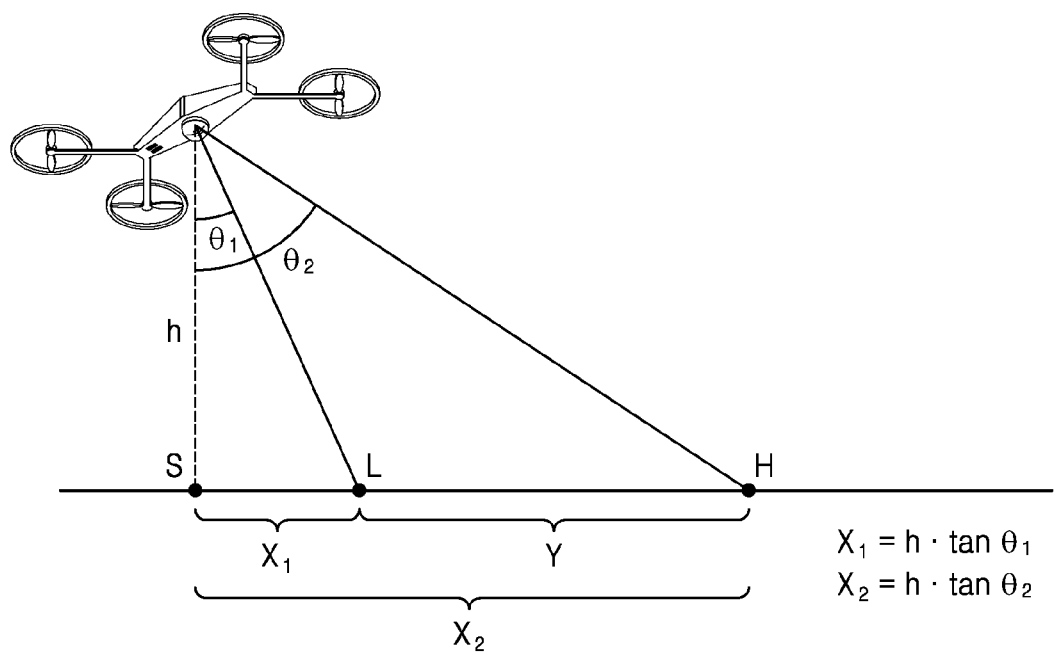
FIGS. 8 through 10 are diagrams for describing an example of generating a perspective map according to an exemplary embodiment.
Figure 9:
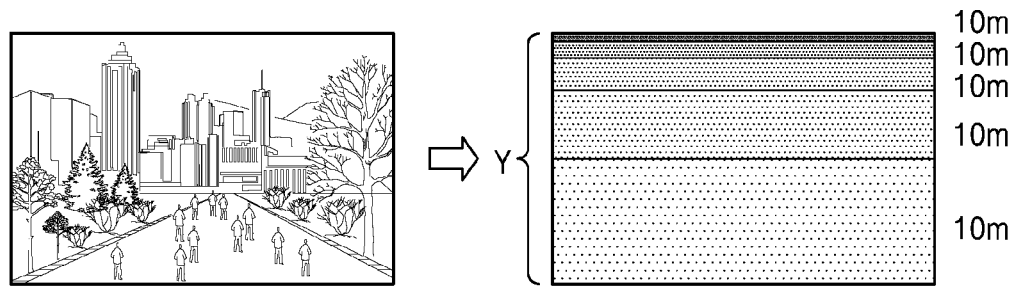
Figure 10:
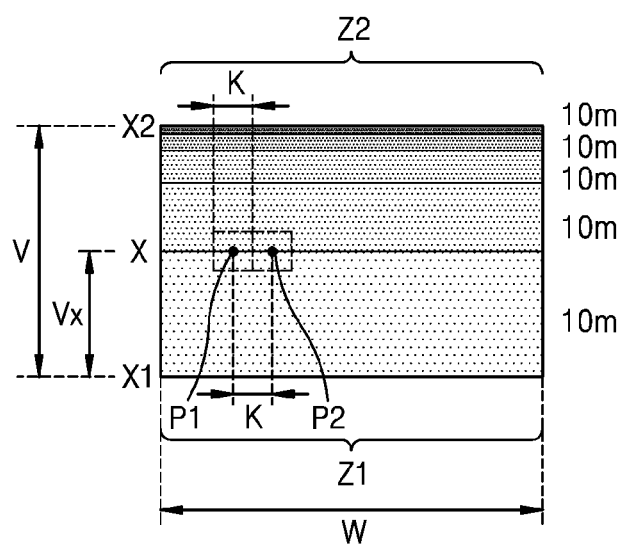
Figure 11:
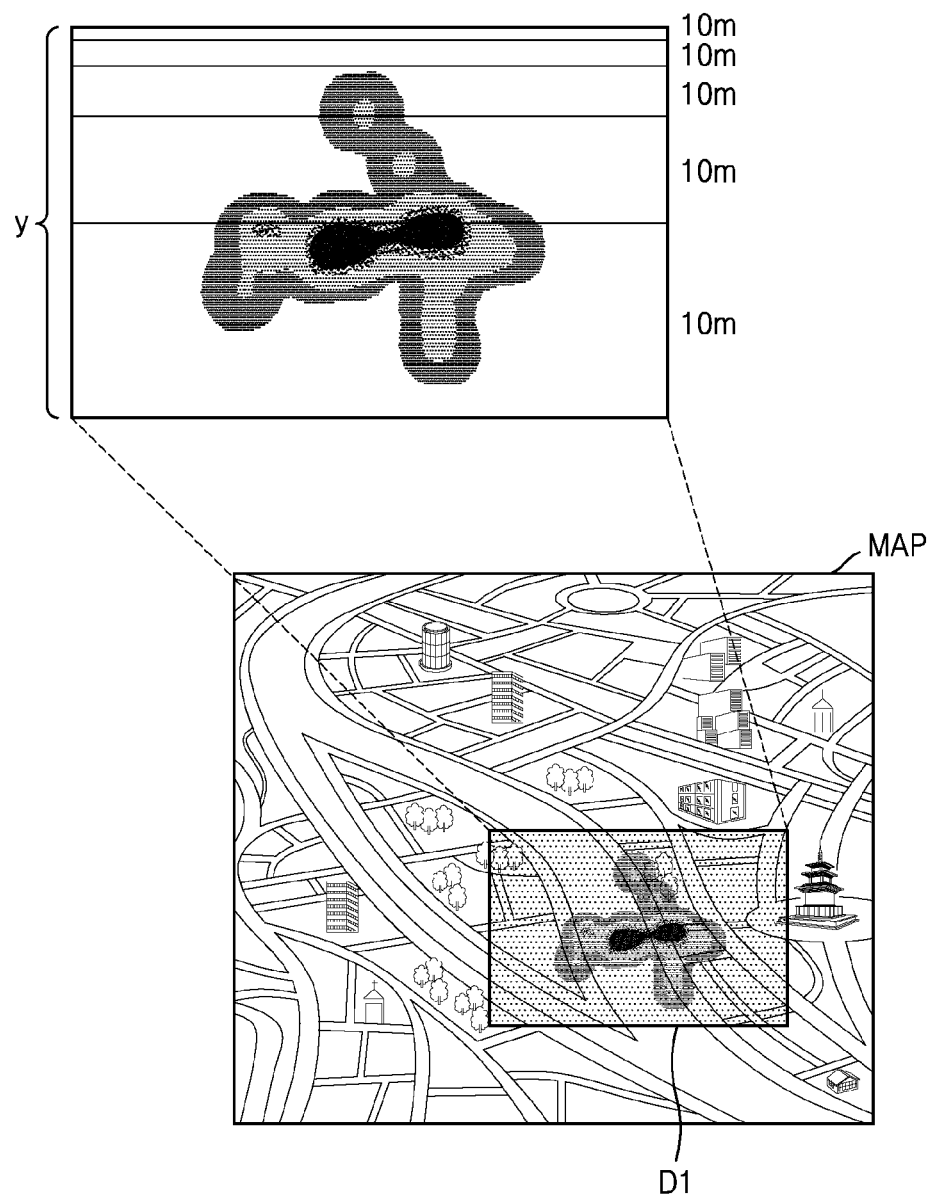
FIGS. 11 and 12 are diagrams for describing an example of generating a crowd heat map according to an exemplary embodiment.
Figure 12:
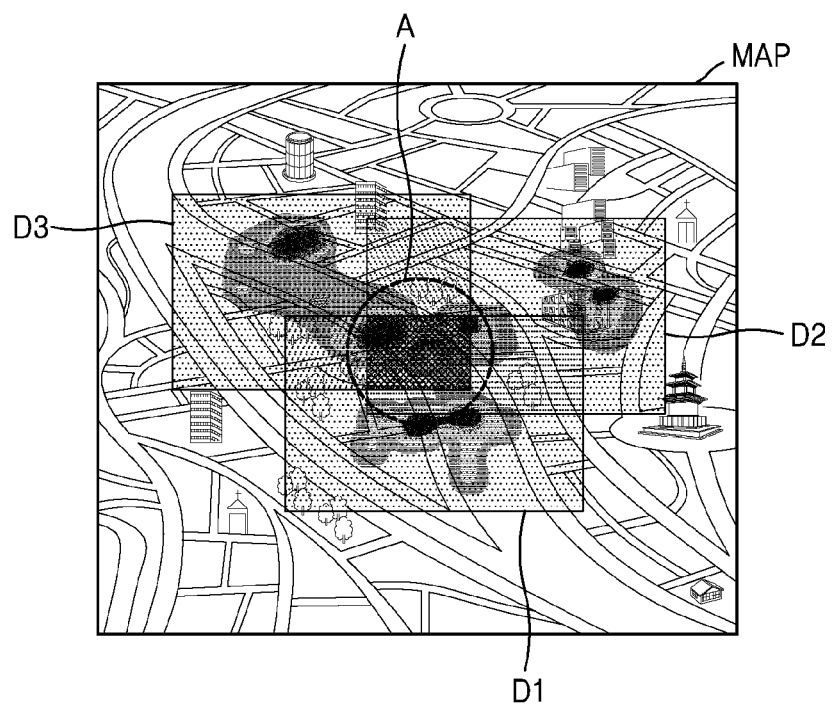

FIG. 3 is a schematic block diagram of the image processing apparatus 30 according to an exemplary embodiment. FIG. 4 is a schematic block diagram of a density map generator 303 according to an exemplary embodiment. FIGS. 5 through 7 are diagrams illustrating a method of generating a density map according to an exemplary embodiment. FIGS. 8 through 10 are diagrams illustrating a method of generating a perspective map according to an exemplary embodiment. FIGS. 11 and 12 are diagrams illustrating a method of generating a crowd heat map according to an exemplary embodiment.

Referring to FIG. 3, the image processing apparatus 30 may include an information obtainer 301, the density map generator 303, a perspective map generator 305, and a heat map generator 307.

The information obtainer 301 may receive images Fin and location information Lin from the aerial vehicle 10 or the camera 20. The images Fin may be image frames obtained by photographing a part of a region of interest. The images Fin, which are sequentially input, may have a time difference. The location information Lin may indicate the location of the aerial vehicle 10 or the camera 20 at an image photographing time. The location information Lin may include GPS information or altitude information of the aerial vehicle 10 or the camera 20.

The camera 20 is mounted on the aerial vehicle 10, and thus the location information of the camera 20 may be used as location information of the aerial vehicle 10 in which the camera 20 is mounted. Thus, hereinafter, the location information indicated below may indicate the location of the camera 20 and/or the aerial vehicle 10.

The information obtainer 301 may synchronize the images Fin and the location information Lin. The information obtainer 301 may generate a data set by matching the images Fin with the location information Lin. The information obtainer 301 may further receive calibration information of the camera 20.

The density map generator 303 may extract crowd density information from the image Fin (hereinafter referred to as input image Fin), which is input with regard to each region, to generate a crowd density map D. As shown in FIG. 4, the density map generator 303 may include a splitter 313 and a classifier 353.

The splitter 313 may split the input image Fin into a plurality of patch images Pin. Each patch image Pin corresponds to an actual area in width (m)×length (m)=n (m)×n (m). The patch images Pin corresponds to an actual area, and thus, the patch images Pin may have different sizes and may be squares or rectangles. As a distance between the camera 20 and the region (scene) increases, a size of the corresponding patch image Pin may decrease. Each of the patch images Pin may be resized to have the same pixel size of m (pixels)×m (pixels). The splitter 313 may receive from the perspective map generator 305 the distance information d indicating an actual distance in a width direction (a horizontal direction) and in a length direction (a vertical direction) of the input image Fin, and may extract the plurality of patch images Pin, which representing actual areas of a uniform size, from the input image Fin based on the distance information. FIG. 5 shows an example of resizing each of the plurality of patch images Pin corresponding to an actual area of 3×3 ($m^2$) as 72×72 ($pixel^2$).

The classifier 353 may extract characteristic information from the patch images Pin and may classify the patch images Pin into a plurality of crowd density classes. The classifier 353 may include a previously trained classifier.

The classifier may train characteristic information of each of the plurality of crowd density classes by using a plurality of pieces of training data. The training data may have a plurality of distributions from a low density to a high density. For example, the training data may be classified as six crowd densities "very high/high/normal/low/very low/none". However, the number of crowd densities may be variously set according to an exemplary embodiment.

The previously trained classifier may extract a characteristic from the patch image Pin and may classify the patch image Pin as one class among the six crowd density classes based on the extracted characteristic. For example, the classifier may calculate a probability of each of the six crowd density classes based on the characteristic of the patch image Pin and may determine a class having the highest probability to be a class Pout of the patch image Pin.

The density map generator 303 may generate the crowd density map D indicating crowd density information of the input image Fin based on a classification result of the classifier 353 with respect to all the patch images Pin of the input image Fin. An index or a color corresponding to the class may be allocated to the classified patch image Pin. FIG. 6 shows an example of a crowd density map on which different colors (expressed as different patterns in FIG. 6) are allocated to the patch images Pin according to a class. In another exemplary embodiment, other visual properties, e.g., patterns or brightness, may be allocated to the patch images, instead of colors.

The density map generator 303 may apply a smoothing filter to the crowd density map D to reconfigure the crowd density map D. The smoothing filter may generate a smoother density map by applying a Gaussian filter, a median filter, a bilateral filter, or a means filter, etc. to the original crowd density map. For example, the density map generator 303 may reconfigure the crowd density map as shown in FIG. 7 by applying the smoothing filter to the crowd density map shown in FIG. 6.

The perspective map generator 305 may generate a perspective map providing actual distance information of the input image Fin based on the location information. A change in a physical location of the aerial vehicle 10 may result in a change in a range (area) of a scene represented by an image obtained by the camera 20 mounted in the aerial vehicle 10. The perspective map generator 305 may calculate an actual distance from a lowermost end to an uppermost end of the input image Fin based on the location information Lin that matches the input image Fin.

In FIG. 8, S denotes a point where a vertical line starting from the aerial vehicle 10 meets the ground. On the other hand, L denotes a position on the ground corresponding to the lowermost end of the input image Fin, and H denotes position on the ground corresponding to the uppermost end of the input image Fin. The perspective map generator 305, as shown in FIG. 8, may calculate X1 indicating a distance between S and L, and X2 indicating a distance between S and H according to Equation 1 below.

$$x_1 = h \cdot \tan \theta_1$$

$$x_2 = h \cdot \tan \theta_2$$

$$y = x_2 - x_1 \qquad \text{[Equation 1]}$$

In Equation 1, h denotes an altitude of the aerial vehicle 10. θ1 denotes an angle formed by a vertical line starting from the aerial vehicle 10 and a line connecting the aerial vehicle 10 and L. θ2 denotes an angle formed by the vertical line and a line connecting the aerial vehicle 10 and H.

The perspective map generator 305 may calculate an actual distance Y in a real world corresponding to a difference (i.e., a vertical size of an image) between the lowermost end and the uppermost end of the input image Fin according to the altitude of the aerial vehicle 10. The perspective map generator 305 may generate a perspective map as shown in FIG. 9 by partitioning the input image Fin with horizontal lines, and each of the lines may be drawn per a uniform actual distance interval, for example, every 10 m interval. That is, the perspective map generator 305 may generate the perspective map having the actual distance information according to a vertical direction of the input image Fin based on the location information of the aerial vehicle 10 or the camera 20. The point H on the ground may be farther than the point L on the ground from the camera 20 and thus a distance between two lines in the input image Fin may be reduced in a direction from the lowermost end to the uppermost end of the input image Fin.

The perspective map generator 305, as shown in FIG. 10, may calculate an actual horizontal distance corresponding to a width, i.e., a horizontal size, of a pixel for, based on an actual horizontal distance Z1 corresponding to the width W of the image at the lowermost end of the image and an actual horizontal distance Z2 corresponding to the width W at the uppermost end, by applying an interpolation method according to Equation 2 below. The actual horizontal distance Z1 and the actual horizontal distance Z2 may be obtained from a camera calibration. The width of a pixel may be an interval between adjacent pixels P1 and P2 in a horizontal direction.

$$k = \frac{Z}{W} \qquad \text{[Equation 2]}$$

$$k_2 \geq k_1$$

$$k_x = k_1 + \frac{v_x}{v}(k_2 - k_1)$$

In Equation 2 above, Z denotes an actual, i.e., real-life, horizontal distance corresponding to a width W of the image at the position X in a real world. W may be represented by the number of pixels. V denotes a length of the image and may be represented by the number of pixels. Vx denotes a length between the lowermost end of the image and the position X, and may be represented by the number of pixels. K denotes the actual horizontal distance per pixel of the image at the position X. In Equation 2, k1 denotes an actual horizontal distance per pixel at the lowermost end of the image, k2 denotes an actual horizontal distance per pixel at the uppermost end of the image, and kx denotes an actual horizontal distance per pixel at the position X (i.e., at the horizontal line including the position X).

The actual horizontal distance k2 per pixel at the uppermost end of the image may be equal to or greater than an actual horizontal distance k2 per unit pixel at the lowermost end of the image. The actual horizontal distance k per pixel may be greater and may linearly increase in a direction from a lower end of the image to an upper end thereof.

The perspective map generator 305 may provide the actual distance information of the input image Fin to the density map generator 303 and the heat map generator 307.

The heat map generator 307 may generate a crowd heat map by matching the crowd density map with a region of interest map, based on the perspective map. The heat map generator 307 may generate the crowd heat map by reflecting distance information of the perspective map and merging the crowd density information of the crowd density map and map information of the region of interest. As shown in FIG. 11, the heat map generator 307 may use the distance information of the perspective map to match a crowd density map D1 generated with respect to an input image of a first direction with a region of interest map MAP. The region of interest map MAP may be provided in a digital map or a satellite and aviation map. The interest region map MAP may be received from an external map database in real time.

The heat map generator 307 may identify part of the region of interest map MAP that corresponds to the crowd density map D1 based on the location information of the aerial vehicle 10 or the camera 20 and the distance information of the perspective map. The heat map generator 307 may convert a size of the crowd density map D1 to correspond to a size of the region of interest map MAP. The heat map generator 307 may convert the crowd density map D1 to correspond to a view shape (a top view) of the region of interest map MAP.

The heat map generator 307 may match the crowd density map D1 on the region of interest map MAP, and control a degree of showing the region of interest map MAP to a user by adjusting transparency of the crowd density map D1. The transparency of the crowd density map D1 may be changed by a setting of the user.

The heat map generator 307, as shown in FIG. 12, may match the plurality of crowd density maps D1 through D3, which are generated using a plurality of input images obtained by photographing the region of interest at a plurality of locations in a plurality of directions, with the region of interest map MAP. The plurality of input images may have a time difference.

The heat map generator 307 may merge crowd density information of an overlapping region between the crowd density maps D1 through D3. For example, the heat map generator 307 may convert crowd density information of an overlapping region A of the first crowd density map D1 obtained by photographing the region of interest in a first direction, the second crowd density map D2 obtained by photographing the region of interest in a second direction, and the third crowd density map D3 obtained by photographing the region of interest in a third direction into one of an average value, a maximum value, a minimum value, and a variation of density information of the first crowd density map D1, density information of the second crowd density map D2, and density information of the third crowd density map D3 to merge the converted crowd density information with the information of the region of interest map MAP.

The heat map generator 307 may generate the crowd heat map according to an input signal of the user to output the crowd heat map on the display 50. When the heat map generator 307 receives a heat map request of a specific time and/or a specific region, the heat map generator 307 may select at least one crowd density map having at least a part included in the specific time and/or the specific region and may match the selected crowd density map with the region of interest map MAP.

Although not shown, the image processing apparatus 30 may include a storage that stores the input image Fin, the location information Lin, and the crowd density map and the perspective map of the input image Fin.

Figure 13:
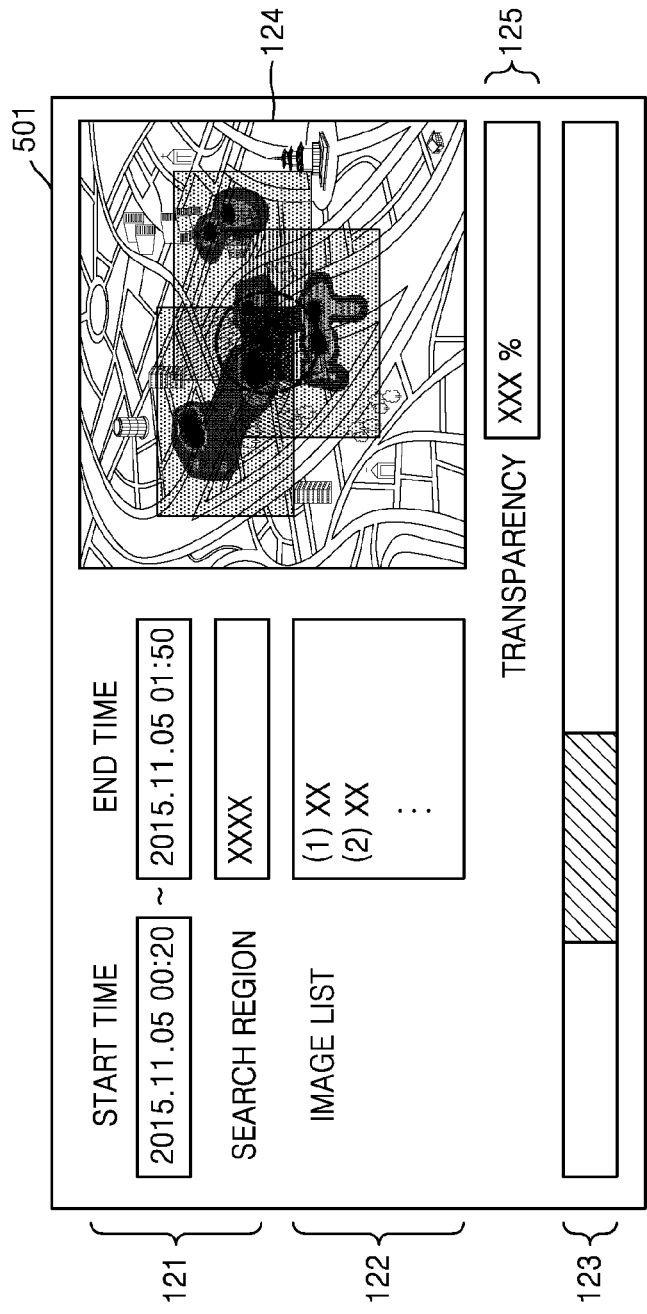
FIG. 13 is a diagram displaying a crowd heat map generating result according to a user search condition according to an exemplary embodiment.

FIG. 13 is a diagram illustrating a method of generating a crowd heat map according to a user search condition according to an exemplary embodiment.

Referring to FIG. 13, a screen 501 of the display 50 may be configured to display a search condition region 121 for selecting a search condition such as a time section for generating a crowd heat map, i.e., a start time and an end time, and a search region. The screen 501 may display a list region 122 for showing a list of input images received between the start time and the end time and/or a list of crowd density map generated with respect to the input images. The screen 501 may display a time axis display region 123 indicating a time, an image display region 124 for displaying an overlap of the region of interest map MAP and the crowd density maps D, and a region 125 for adjusting a transparency of the crowd density maps D.

In an exemplary embodiment, a user may directly input or select the time section and/or the search region in the search condition region 121. In another exemplary embodiment, the user may designate the time section in a timeline of the time axis display region 123 and designate the search region from the MAP by dragging a mouse or via a touch in the image display region 124.

The image processing apparatus 30 may generate the crowd heat map according to the input signal of the user through the input apparatus 40 to output the crowd heat map to the display 50. The image processing apparatus 30 may receive the input signal corresponding to the search condition selected in the search condition region 121 or the time axis display region 123 and the image display region 124. The image processing apparatus 30 may select a crowd density map of at least one input image satisfying at least a part of the search condition. The image processing apparatus 30 may output a result of matching the at least one selected crowd density map with the region of interest map MAP to the display 50.

The image processing apparatus 30 may adjust the transparency of the crowd density map D1 that matches the region of interest map MAP according to a transparency selection input signal set in the region 125 to adjust a degree of the region of interest map MAP that is shown to the user.

Figure 14:
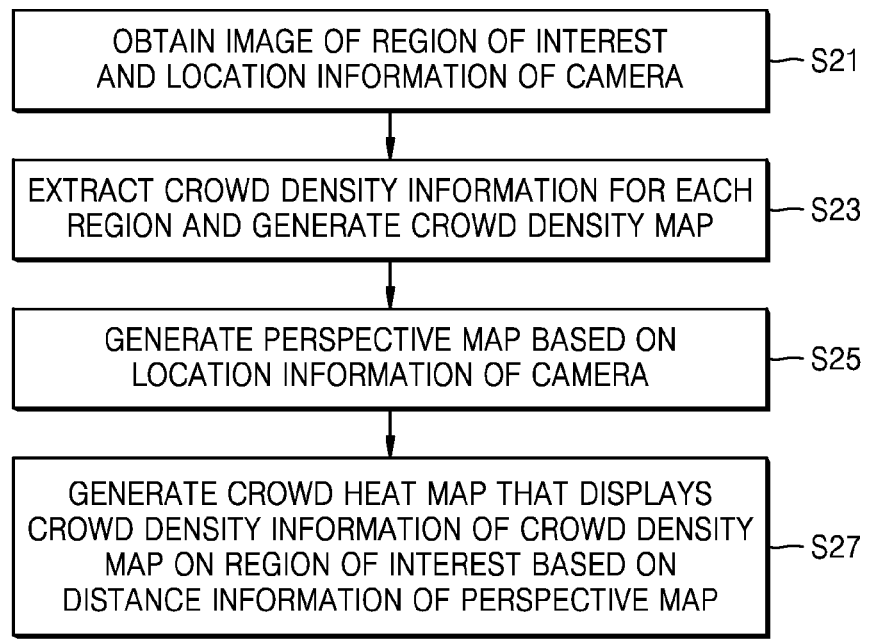
FIGS. 14 and 15 are schematic flowcharts of an image processing method for generating a crowd heat map according to an exemplary embodiment.
Figure 15:
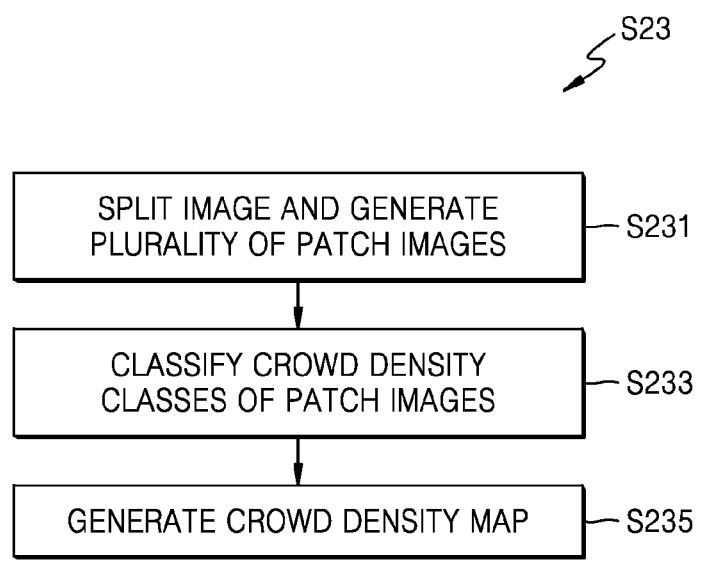

FIGS. 14 and 15 are schematic flowcharts illustrating a method for generating a crowd heat map according to an exemplary embodiment.

The image processing method for generating the crowd heat map according to an exemplary embodiment may be performed by the image processing apparatus 30 shown in FIG. 3.

Referring to FIG. 14, the image processing apparatus 30 may receive an image and location information from the aerial vehicle 10 flying over a region of interest or from the camera 20 mounted in the aerial vehicle 10 (operation S21). The location information may indicate the location of the aerial vehicle 10 or the location of the camera 20 at the time when the image is obtained. The location information may include GPS information and altitude information. The camera 20 may be mounted in the aerial vehicle 10 to photograph the region of interest in real time or periodically, and thus the location of the aerial vehicle 10 may be estimated as the location of the camera 20.

The image processing apparatus 30 may synchronize the input image and the location information to generate a data set that matches the input image and the location information.

The image processing apparatus 30 may extract crowd density information in a region unit to generate a crowd density map (operation S23).

Referring to FIG. 15, the image processing apparatus 30 may split the input image into a plurality of patch images (operation S231). The patch images may have an actual area given by width (m)×length (m)=n (m)×n (m). As distances between the camera 20 and the ground position increase, sizes of the corresponding patch images may decrease. Widths and lengths of the patch images may be different. The patch images may be resized as an image having a size of m (pixel number)×m (pixel number). The resized patch images may have the same size.

The image processing apparatus 30 may extract characteristic information from the resized patch image and may classify the patch image as one crowd density class (operation S233). The image processing apparatus 30 may extract a characteristic from the patch image by using a previously trained classifier, calculate a probability of each of a plurality of previously set crowd density classes based on the extracted characteristic, and classify a class having the highest probability as a class of the patch image.

The image processing apparatus 30 may generate a crowd density map indicating crowd density information of the input image based on a class classification result with respect to all the patch images (operation S235). An index or a color corresponding to the class may be allocated to each patch image. The image processing apparatus 30 may apply a smoothing filter to the crowd density map to reconfigure the crowd density map.

The image processing apparatus 30 may generate a perspective map providing actual distance information of the input image based on the location information that matches the input image (operation S25). The image processing apparatus 30 may calculate an actual distance corresponding to a length from a lowermost end to an uppermost end of the input image and generate the perspective map in which multiple horizontal lines may be defined to indicate actual distances of a uniform interval. A distance between an actual ground position corresponding to the uppermost end of the input image and the camera may be farther than a distance between an actual ground position corresponding to the lowermost end of the input image and the camera. Thus, an interval between the horizontal lines in the image may be reduced from the lowermost end to the uppermost end of the input image. The image processing apparatus 30 may calculate an actual horizontal distance for each location of the input image and match the actual horizontal distance with the perspective map. The actual horizontal distance per pixel may increase from the lowermost end to the uppermost end of the input image.

The image processing apparatus 30 may match a crowd density map to which the smoothing filter is not applied or the crowd density map to which the smoothing filter is applied with a region of interest map based on the perspective map and display by overlapping the crowd density map and the region of interest map (operation S27). The image processing apparatus 30 may generate the crowd heat map by reflecting distance information of the perspective map and merging the crowd density information of the crowd density map with map information of the region of interest map. The image processing apparatus 30 may convert a size and a view type of the crowd density map to correspond to those of the region of interest map and then may match the converted crowd density map with the region of interest map.

Figure 16:
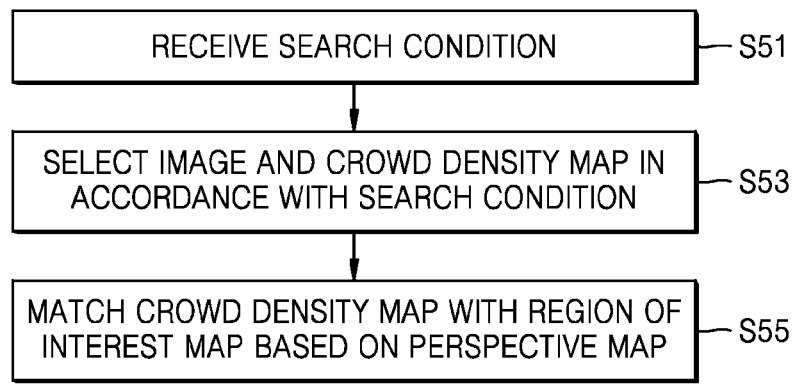
FIG. 16 is a schematic flowchart of an image processing method for generating a crowd heat map according to another embodiment.

FIG. 16 is a schematic flowchart illustrating a method for generating a crowd heat map according to another exemplary embodiment.

Referring to FIG. 16, the image processing apparatus 30 may receive a search condition for generating the crowd heat map from a user through the input apparatus 40 (operation S51). The search condition may be a time period and/or a search region that is to display the crowd heat map.

The image processing apparatus 30 may select at least one input image and a crowd density map of the input image that satisfy the search condition (operation S53). The image processing apparatus 30 may select the input image and the crowd density map that satisfy at least a part of the search condition. For example, the image processing apparatus 30 may select the crowd density map of the input image including a part of the search region in order to generate the crowd heat map.

The image processing apparatus 30 may generate the crowd heat map that matches the at least one selected crowd density map with a region of interest map based on a perspective map (operation S55).

In an exemplary embodiment, if a search condition is input, the image processing apparatus 30 may select input images that coincide with at least a part of the search condition, may generate a crowd density map and a perspective map of the selected input images, and may generate a crowd heat map that matches the generated crowd density map with the region of interest map based on the perspective map.

In another exemplary embodiment, if images are input, the image processing apparatus 30 may generate a crowd density map and a perspective map of the input images in real time, and if a search condition is input, the image processing apparatus 30 may generate a crowd heat map that matches the crowd density map of the input images that coincide with at least a part of the search condition with the region of interest map based on the perspective map.

According to the exemplary embodiments, a crowd heat map maybe generated by measuring a crowd density for each region of an image obtained through camera photographing through a trained classifier and using location information of an aerial vehicle or a camera at the time of photographing.

In one of the conventional methods of generating a heat map, a region of interest is photographed by using a camera, a motion occurrence frequency is measured within an image, and the motion occurrence frequency is represented as a color. In such a conventional method, it is difficult to extract information when a human does not move and stands still. When humans are overcrowded in a small space, since stagnant motions are present and less motion information is extracted compared to an actual high human density, it difficult to obtain an accurate result using this conventional method. The conventional method uses a camera fixed to a high place such as a ceiling and pointing downwards, and thus, it is difficult to use the camera outdoors, and numerous cameras are necessary for covering a wide region.

According to the exemplary embodiments, a plurality of images may be obtained at a plurality of locations by using only one camera mounted in an aerial vehicle, thereby covering a wide region. An image may be obtained from a high place through flying of the aerial vehicle. Thus, no separate support is needed on the ground for fixing a camera and the exemplary embodiments may be easily applied to an outdoor environment.

A method of generating a crowd heat map by using images obtained by a camera mounted in one aerial vehicle in a plurality of directions is described in the above-described exemplary embodiments, but the exemplary embodiments are not limited thereto. For example, the crowd heat map may be generated by using images received from a plurality of CCTV cameras, not from an aerial vehicle, that are fixed at the same altitude at different locations. In this case, a perspective map may be generated just once, thereby generating the crowd heat map quickly and easily. Alternatively, the crowd heat map may be generated by using images obtained by cameras mounted in a plurality of aerial vehicles.

The image processing apparatus and method according to the exemplary embodiments may provide a crowd heat map visibly representing a crowd density with respect to a wide region.

The image processing method for generating a crowd heat map according to the exemplary embodiments may also be implemented as computer-readable codes on a computer-readable recording medium. The computer-readable recording medium is any data storage device that may store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network coupled computer systems so that the computer-readable code is stored and executed in a distributed fashion. Also, functional programs, codes, and code segments for accomplishing one or more embodiments may be easily construed by programmers skilled in the art to which the one or more embodiments pertains.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An image processing apparatus comprising at least one processor to implement:
   an information obtainer configured to obtain an image created by photographing a region of interest and location information indicating a location from which the image is photographed;
   a density map generator configured to generate a crowd density map of the image based on crowd density information estimated from the image;
   a perspective map generator configured to generate a perspective map that provides distance information indicating a real-life distance between two points in the image based on the location information; and
   a heat map generator configured to generate a heat map that displays the crowd density map on a map of the region of interest based on the distance information,
   wherein the density map generator is further configured to:
      split the image into patch images respectively representing different parts of the region of interest, the different parts being of a same real-life size,
      estimate a crowd density class of each of the patch images based on characteristic information extracted from each of the patch images, and
      estimate the crowd density information based on the crowd density class.

2. The image processing apparatus of claim 1, wherein the density map generator is configured to resize the patch images to have a same pixel size, and estimate the crowd density class of the patch images using the resized patch images.

3. The image processing apparatus of claim 1, wherein the density map generator is configured to calculate a probability with respect to each of previously set crowd density classes using the characteristic information of the patch images and classify each of the patch images based on the probability.

4. The image processing apparatus of claim 1, wherein the density map generator is configured to allocate different visual properties to the patch images based on the crowd density class.

5. The image processing apparatus of claim 1, wherein the perspective map shows multiple horizontal lines, and
   wherein a real-life distance between any two adjacent horizontal lines from among the multiple horizontal lines is uniform.

6. The image processing apparatus of claim 1, wherein the heat map generator is configured to adjust transparency of the crowd density map that overlaps the map of the region of interest.

7. The image processing apparatus of claim 1, wherein the heat map generator is configured to merge crowd density information of a plurality of crowd density maps at an overlapping region according to a preset merge condition and display the merged crowd density information on the map of the region of interest.

8. The image processing apparatus of claim 1, wherein the location information comprises GPS information and altitude information.

9. The image processing apparatus of claim 1, wherein the location information indicates a location of an aerial vehicle in which a camera that created the image is mounted.

10. An image processing method performed by an image processing apparatus, the image processing method comprising:
    obtaining an image created by photographing a region of interest and location information indicating a location from which the image is photographed;
    generating a crowd density map of the image based on crowd density information estimated from the image;
    generating a perspective map that provides distance information indicating a real-life distance between two points in the image based on the location information; and
    generating a heat map that displays the crowd density map on a map of the region of interest based on the distance information,
    wherein the generating of the crowd density map comprises:
       splitting the image into patch images respectively representing different parts of the region of interest, the different parts being of a same real-life size;
       estimating a crowd density class of each of the patch images based on characteristic information extracted from each of the patch images; and
       estimating the crowd density information based on the crowd density class.

11. The image processing method of claim 10, wherein the estimating comprises:
    resizing the patch images to have a same pixel size; and
    estimating the crowd density class of the patch images using the resized patch images.

12. The image processing method of claim 10, wherein the estimating of the crowd density class comprises:
    calculating a probability with respect to each of previously set crowd density classes using the characteristic information of the patch images and classifying the patch images based on the probability.

13. The image processing method of claim 10, wherein the generating of the crowd density map comprises:
    allocating different visual properties to the patch images based on the crowd density class.

14. The image processing method of claim 10, wherein the perspective map shows multiple horizontal lines, and wherein a real-life distance between any two adjacent horizontal lines from among the multiple horizontal lines is uniform.

15. The image processing method of claim 10, wherein the generating of the heat map comprises:
adjusting transparency of the crowd density map that overlaps the map of the region of interest.

16. The image processing method of claim 10, wherein the generating of the heat map comprises:
merging crowd density information of a plurality of crowd density maps at an overlapping region according to a preset merge condition and displaying the merged crowd density information on the map of the region of interest.

17. The image processing method of claim 10, wherein the location information comprises GPS information and altitude information.

18. A non-transitory computer-readable recording medium having recorded thereon a computer program for executing the image processing method of claim 10.

* * * * *